US 11,149,881 B2

(12) United States Patent
Sugino et al.

(10) Patent No.: US 11,149,881 B2
(45) Date of Patent: Oct. 19, 2021

(54) THREADED CONNECTION FOR STEEL PIPE

(71) Applicants: Nippon Steel Corporation, Tokyo (JP); Vallourec Oil and Gas France, Aulnoye-Aymeries (FR)

(72) Inventors: Masaaki Sugino, Tokyo (JP); Shin Ugai, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 313 days.

(21) Appl. No.: 16/475,203

(22) PCT Filed: Dec. 27, 2017

(86) PCT No.: PCT/JP2017/046878
§ 371 (c)(1),
(2) Date: Jul. 1, 2019

(87) PCT Pub. No.: WO2018/135266
PCT Pub. Date: Jul. 26, 2018

(65) Prior Publication Data
US 2019/0338872 A1 Nov. 7, 2019

(30) Foreign Application Priority Data
Jan. 18, 2017 (JP) .............................. JP2017-006321

(51) Int. Cl.
*F16L 15/00* (2006.01)
*E21B 17/042* (2006.01)
*F16L 57/06* (2006.01)

(52) U.S. Cl.
CPC .......... *F16L 15/006* (2013.01); *E21B 17/042* (2013.01); *F16L 57/06* (2013.01)

(58) Field of Classification Search
CPC ....... F16L 15/004; F16L 15/04; F16L 15/009; E21B 17/042
See application file for complete search history.

(56) References Cited

U.S. PATENT DOCUMENTS

| 4,538,840 A | 9/1985 | DeLange | |
| 2004/0262919 A1 * | 12/2004 | Dutilleul | F16L 15/004 |
| | | | 285/333 |

(Continued)

FOREIGN PATENT DOCUMENTS

| CA | 2862833 A1 * | 7/2013 | ............ F16L 15/004 |
| CA | 3013300 A1 * | 8/2017 | ........... E21B 17/042 |

(Continued)

OTHER PUBLICATIONS

English Abstract & Family List of WO2004109173A1.

(Continued)

*Primary Examiner* — David Bochna
(74) *Attorney, Agent, or Firm* — Banner & Witcoff, Ltd.

(57) ABSTRACT

A threaded connection for steel pipe is provided that prevents galling on the sealing surfaces during make-up while providing high sealing performance after completion of make-up. The pin (10) includes a nose (112) including a pin taper guide surface (112a) and a pin sealing surface (113) including a taper surface (113a). The box (20) includes a nose-receiving portion (22) including a box taper guide surface (22a), a box sealing surface (23) including a taper surface (23a), and a buffer surface (24). The taper angle of the taper surfaces (113a, 23a) includes a second taper angle larger than the taper angle of the taper guide surfaces (112a, 22a). The threaded connection (1) is constructed so as to satisfy $Dp2>Db2>Dp1$ and $Lb2>Lp2$. The buffer surface (24), located between the box taper guide surface (22a) and taper surface (23a), has a length of 0.75 mm or larger, and (Continued)

is located outward of an imaginary plane (V) determined along radial directions.

7 Claims, 11 Drawing Sheets

(56) References Cited

U.S. PATENT DOCUMENTS

| | | | | |
|---|---|---|---|---|
| 2005/0248153 A1* | 11/2005 | Sugino | ............... | F16L 15/004 |
| | | | | 285/333 |
| 2011/0241340 A1* | 10/2011 | Okada | ............... | E21B 17/042 |
| | | | | 285/333 |
| 2020/0056431 A1* | 2/2020 | Pusard | ............... | E21B 17/042 |

FOREIGN PATENT DOCUMENTS

| | | | |
|---|---|---|---|
| EP | 2196714 | A1 | 6/2010 |
| EP | 3093543 | A1 | 11/2016 |
| JP | 2012506000 | A | 3/2012 |
| JP | 2013524116 | A | 6/2013 |
| WO | 2004109173 | A1 | 12/2004 |
| WO | 2009060552 | A1 | 5/2009 |
| WO | 2015077464 | A2 | 5/2015 |

OTHER PUBLICATIONS

English Abstract & Family List of WO2009060552A1.
English Abstract & Family List of JP2012506000A.
English Abstract & Family List of JP2013524116A.

* cited by examiner

THREADED CONNECTION FOR STEEL PIPE

RELATED APPLICATION DATA

This application is a National Stage Application under 35 U.S.C. 371 of co-pending PCT application number PCT/JP2017/046878 designating the United States and filed Dec. 27, 2017; which claims the benefit of JP application number 2017-006321 and filed Jan. 18, 2017 each of which are hereby incorporated by reference in their entireties.

TECHNICAL FIELD

The present disclosure relates to a threaded connection for steel pipe.

BACKGROUND ART

Steel pipes called oil country tubular goods are used, for example, for prospecting or producing oil or natural gas in oil wells or natural-gas wells (hereinafter collectively referred to as "oil wells"), developing non-conventional resources such as oil sand or shale gas, retrieving or storing carbon dioxide (Carbon dioxide Capture and Storage (CCS)), geothermal power generation, or in hot springs. A threaded connection is used to connect steel pipes.

Such threaded connections for steel pipe are generally categorized as coupling type and integral type. A coupling-type connection connects a pair of pipes, one of which is a steel pipe and the other one is a coupling. In this case, a male thread is provided on the outer periphery of each of the ends of the steel pipe, while a female thread is provided on the inner periphery of each of the ends of the coupling. Then, the male thread of the steel pipe is screwed into the female thread of the coupling such that they are made up and connected. An integral-type connection connects a pair of pipes that are both steel pipes, and does not use a separate coupling. In this case, a male thread is provided on the outer periphery of one end of each steel pipe, while a female thread is provided on the inner periphery of the other end. Then, the male thread of one steel pipe is screwed into the female thread of the other steel pipe such that they are made up and connected.

A connection portion of a pipe end on which a male thread is provided includes an element to be inserted into a female thread, and thus is usually referred to as "pin". A connection portion of a pipe end on which a female thread is provided includes an element for receiving a male thread, and thus is referred to as "box". A pin and a box constitute ends of pipes and are thus tubular in shape.

A threaded connection for steel pipe is required to have good sealing performance against pressure fluid from the inside (hereinafter also referred to as "internal pressure") and pressure fluid from the outside (hereinafter also referred to as "external pressure"). To address this, the thread connection is provided with a seal that uses metal-to-metal contact. The seal using metal-to-metal contact is composed of a pin sealing surface and a box sealing surface that has a diameter slightly smaller than the diameter of the pin sealing surface. When the threaded connection is made up and the sealing surfaces are fitted together, the presence of an amount of interference, which is the difference between the diameter of the pin sealing surface and the diameter of the box sealing surface, causes the diameter of the pin sealing surface to decrease and the diameter of the box sealing surface to increase. Each of the sealing surfaces tries to recover to their original diameters and thus produces an elastic recovery, thereby generating contact pressures on the sealing surfaces, which now adhere to each other along the entire periphery to provide sealing performance.

Some threaded connections include a structure called "nose" to further improve the sealing performance of the seal. The nose is provided at the tip of the pin and located adjacent to the pin sealing surface. The nose does not interfere with the box and thus amplifies the elastic recovery of the pin sealing surface. Since the nose amplifies the adhesion of the sealing surfaces, the sealing performance of the seal improves.

WO 2009/060552 and JP 2012-506000 each disclose a threaded connection for steel pipe including a nose located between the pin shoulder surface and pin sealing surface. In each of these threaded connections, the outer peripheral surface of the nose of the pin includes a non-contact region, and the portion of the inner peripheral surface of the box that corresponds to the nose has a non-contact region that does not contact the pin's non-contact region when the connection has been made up. Each of the non-contact regions is formed by a taper surface or a cylindrical surface.

JP 2013-524116 A discloses a threaded connection for steel pipe in which the pin sealing surface and box sealing surface are formed by curved surfaces with different curvatures. In this threaded connection, a taper surface is provided to be contiguous to the pin sealing surface and a taper surface is provided to be contiguous to the box sealing surface.

SUMMARY OF THE DISCLOSURE

When the threaded connection is made up and the sealing surfaces fit, the nose amplifies the adhesion of the sealing surfaces to improve the sealing performance. However, during make-up, the amplification of adhesion (i.e. contact force) provided by the nose may cause galling on the sealing surfaces.

An object of the present disclosure is to provide a threaded connection for steel pipe that prevents galling on the sealing surfaces during make-up while providing high sealing performance after completion of make-up.

The present disclosure is directed to a threaded connection for steel pipe. The threaded connection includes a tubular pin and a tubular box. The pin is provided at an end of a steel pipe body. The pin is inserted into the box such that the box and the pin are made up. The pin includes a pin lip and a male thread. The pin lip forms a tip portion of the pin. The male thread is provided on an outer periphery of the pin and located closer to the steel pipe body than the pin lip. The male thread is a tapered thread. The pin lip includes a first pin shoulder surface, a nose and a first pin sealing surface. The first pin shoulder surface is provided on a tip of the pin. The nose is located closer to the male thread than the first pin shoulder surface. The nose includes a pin taper guide surface on its outer periphery. The pin taper guide surface has a diameter decreasing toward the tip of the pin. The first pin sealing surface is provided on an outer periphery of the pin lip and located closer to the male thread than the nose. The first pin sealing surface includes a taper surface having a diameter decreasing toward the tip of the pin. The box includes a first box shoulder surface, a nose-receiving portion, a first box sealing surface, a buffer surface, and a female thread. The first box shoulder surface is located on an interior end of the box to correspond to the first pin shoulder surface. The first box shoulder surface is in contact with the first pin shoulder surface when the connection has been made up. The nose-receiving portion is provided to correspond to the nose. The nose-receiving portion includes a box taper guide surface on its inner periphery. The box taper guide surface has a diameter decreasing toward the interior end of the box. The first box sealing surface is provided on an inner periphery of the box to correspond to the first pin sealing surface. The first box sealing surface includes a taper surface having a diameter decreasing toward the interior end of the box. The first box sealing surface is in contact with the first pin sealing surface when the connection has been made up. The buffer surface is provided on the inner periphery of the box and located between the box taper guide surface and the taper surface of the first box sealing surface. The female thread is provided on the inner periphery of the box to correspond to the male thread. The female thread is a tapered thread. Each of the pin taper guide surface and the box taper guide surface has a first taper angle. Each of the taper surfaces of the first pin sealing surface and the first box sealing surface has a second taper angle. The second taper angle is larger than the first taper angle. When the connection is not made up, the following expressions, (1) and (2), are satisfied:

$$Dp2 > Db2 > Dp1 \quad (1), \text{ and}$$

$$Lb2 > Lp2 \quad (2),$$

where $Dp1$ is the diameter of the end of the pin taper guide surface which is closer to the tip of the pin; $Dp2$ is the diameter of the intersecting line of a plane extending from the pin taper guide surface and a plane extending from the taper surface of the first pin sealing surface; $Lp2$ is the length as measured in a pipe-axis direction of the threaded connection which starts with the tip of the pin and ends with the intersecting line of the plane extending from the pin taper guide surface and the plane extending from the taper surface of the first pin sealing surface; $Db2$ is the diameter of the intersecting line of a plane extending from the box taper guide surface and a plane extending from the taper surface of the first box sealing surface; and $Lb2$ is the length as measured in the pipe-axis direction which starts with the interior end of the box and ends with the intersecting line of the plane extending from the box taper guide surface and the plane extending from the taper surface of the first box sealing surface.

The buffer surface has a length of 0.75 mm or larger as measured in the pipe-axis direction. The buffer surface is located outward of an imaginary plane as determined along a radial direction of the threaded connection. The imaginary plane is formed by the plane extending from the box taper guide surface and the plane extending from the first box sealing surface.

The threaded connection for steel pipe according to the present disclosure prevents galling on the sealing surfaces during make-up while providing high sealing performance after completion of make-up.

EMBODIMENTS FOR CARRYING OUT THE INVENTION

Figure 1:
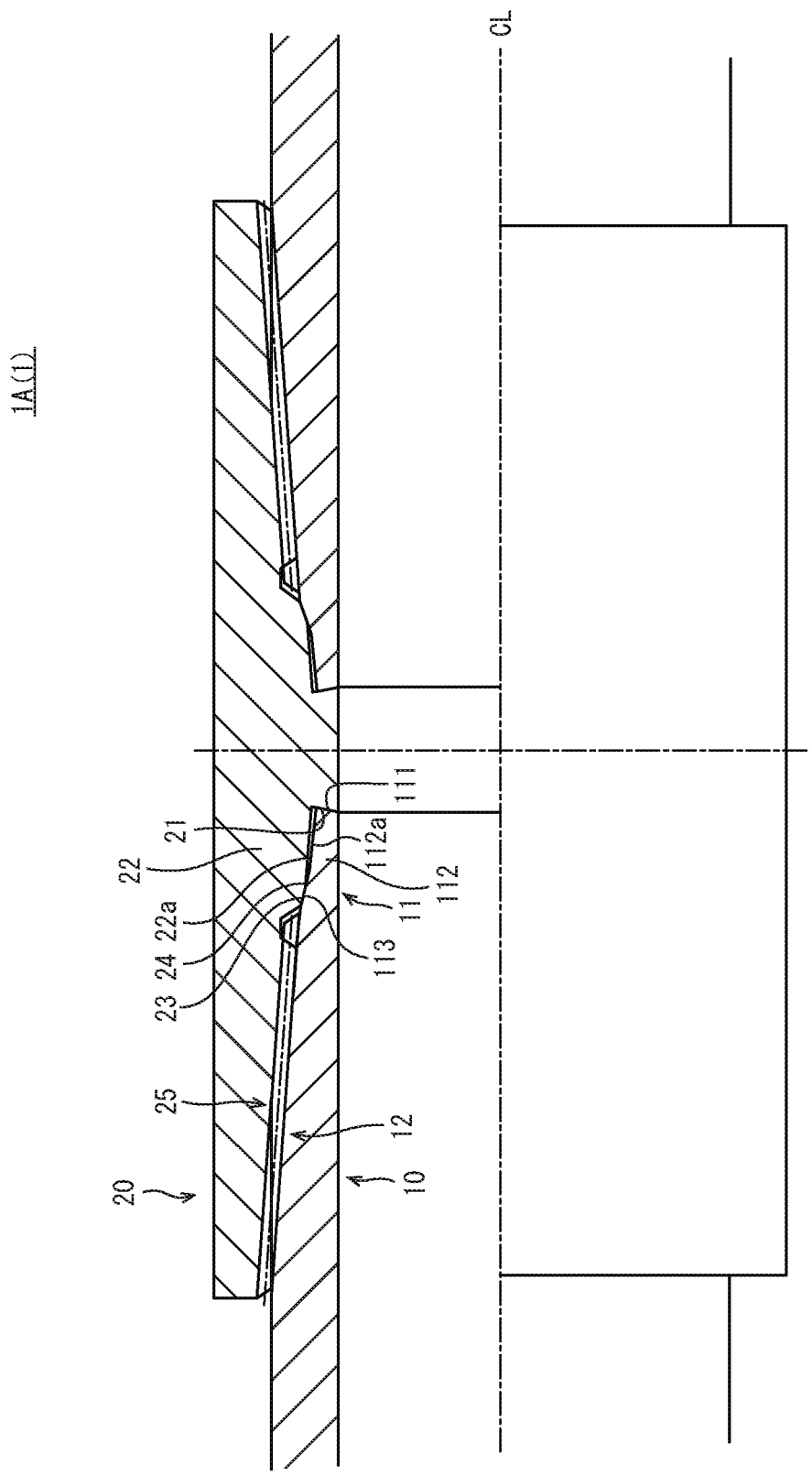
FIG. 1 is a schematic longitudinal cross-sectional view of a coupling-type threaded connection for steel pipe according to a first embodiment.

As discussed above, the nose improves the sealing performance of the seal. The nose has the effect of increasing the rigidity of the tip portion of the pin (i.e. pin lip) against deformation. This effect of the nose improves the contact surface pressure between the sealing surfaces, and also maintains a stable contact surface pressure even when a combined load is applied to cause small plastic deformation of the shoulder and nearby portions.

While the nose provides good sealing performance, it may be a factor responsible for galling on the sealing surfaces during make-up of the threaded connection. This is because the ability of the nose to increase the contact surface pressure between the sealing surfaces also increases the contact surface pressure between the sealing surfaces when the sealing surfaces slide against each other during a make-up process.

Another factor responsible for galling during make-up is eccentric contact between the pin sealing surface and box sealing surface. That is, during make-up, if the pin sealing surface and box sealing surface begin to be in contact when the threads have not yet been completely tightened up and there is flexibility, then, the pin sealing surface and box sealing surface may not be in contact with each other homogeneously over the entire circumference, i.e. may slide with eccentric contact. In such cases, galling is highly likely to occur in portions of the sealing surfaces where eccentric contact is occurring. Even if it does not go as far as galling, damage such as scratches is caused on the sealing surfaces, which may lead to decreased sealing performance.

To prevent galling on the sealing surfaces, a surfaces treatment for providing good galling resistance may be used, such as copper plating or copper-tin-zinc plating. However, these surface treatments are expensive and suffer from low productivity.

To prevent galling on the sealing surfaces, a lubricant may be used. Lubricants with good anti-galling properties include, for example, thread compounds containing heavy metals complying with the API (American Petroleum Institute) standards (i.e. API-standard dopes). Today, however, environment friendliness may require the use of thread compounds containing no heavy metals (i.e. yellow dopes). The anti-galling properties of yellow dopes are typically inferior to those of API-standard dopes. In view of this, a certain galling resistance must be provided using techniques other than lubricants.

In view of these circumstances, the present inventors attempted to find a way to eliminate the factors responsible for galling during make-up while making it possible to enjoy the advantage of the nose, i.e. providing high sealing performance after completion of make-up. This will be discussed in more detail below.

The present inventors considered providing a taper guide surface on each of the pin and box such that the taper guide surfaces can interfere with and slide against each other before the sealing surfaces begin to slide against each other. In this way, the pipe axis of the pin is aligned with the pipe axis of the box before the sealing surfaces begin to slide against each other. This prevents the pin sealing surface and box sealing surface from sliding against each other with eccentric contact. Further, the distance along which the sealing surfaces slide against each other is reduced by the difference between the diameter of the pin taper guide surface and the diameter of the box taper guide surface (i.e. amount of interference). This prevents galling on the sealing surfaces.

The taper guide surfaces slide against each other during make-up, but they are not in contact with each other after completion of make-up. When the connection has been made up, the pin taper guide surface and the box taper guide surface face each other, separated by a clearance. Thus, when the connection has been made up, a taper guide surface, i.e. the nose increases the contact pressure between the sealing surfaces, providing good sealing performance.

However, if taper guide surfaces on the pin and box are introduced, the border portion between the box taper guide surface and box sealing surface slides during make-up while being pressed strongly against the pin taper guide surface. This increases the contact surface pressure at the border portion, which may cause wear or plastic deformation, if not galling, of the surfaces. If this damage or deformation reaches as far as the box sealing surface, the pin sealing surface wears down. As a result, galling may occur, or the sealing performance, especially that against the external pressure, may decrease.

To address the above-discussed problems, the present inventors decided to provide a buffer surface between the box taper guide surface and box sealing surface. That is, forming a buffer surface in the border portion between the box taper guide surface and box sealing surface separates the box sealing surface from the box taper guide surface. This will prevent damage or deformation at the associated end of the box taper guide surface from reaching the box sealing surface.

The threaded connection for steel pipe according to an embodiment was made based on the above findings.

The threaded connection for steel pipe according to an embodiment includes a tubular pin and a tubular box. The pin is provided at an end of a steel pipe body. The pin is inserted into the box such that the box and the pin are made up. The pin includes a pin lip and a male thread. The pin lip forms a tip portion of the pin. The male thread is provided on an outer periphery of the pin and located closer to the steel pipe body than the pin lip is. The male thread is a tapered thread. The pin lip includes a first pin shoulder surface, a nose and a first pin sealing surface. The first pin shoulder surface is provided on a tip of the pin. The nose is located closer to the male thread than the first pin shoulder surface is. The nose includes a pin taper guide surface on its outer periphery. The pin taper guide surface has a diameter decreasing toward the tip of the pin. The first pin sealing surface is provided on an outer periphery of the pin lip and located closer to the male thread than the nose is. The first pin sealing surface includes a taper surface having a diameter decreasing toward the tip of the pin. The box includes a first box shoulder surface, a nose-receiving portion, a first box sealing surface, a buffer surface, and a female thread. The first box shoulder surface is located on an interior end of the box to correspond to the first pin shoulder surface. The first box shoulder surface is in contact with the first pin shoulder surface when the connection has been made up. The nose-receiving portion is provided to correspond to the nose. The nose-receiving portion includes a box taper guide surface on its inner periphery. The box taper guide surface has a diameter decreasing toward the interior end of the box. The first box sealing surface is provided on an inner periphery of the box to correspond to the first pin sealing surface. The first box sealing surface includes a taper surface having a diameter decreasing toward the interior end of the box. The first box sealing surface is in contact with the first pin sealing surface when the connection has been made up. The buffer surface is provided on the inner periphery of the box and located between the box taper guide surface and the taper surface of the first box sealing surface. The female thread is provided on the inner periphery of the box to correspond to the male thread. The female thread is a tapered thread. Each of the pin taper guide surface and the box taper guide surface has a first taper angle. Each of the taper surfaces of the first pin sealing surface and the first box sealing surface has a second taper angle. The second taper angle is larger than the first taper angle. When the connection is not made up, the following expressions, (1) and (2), are satisfied:

$$Dp2 > Db2 > Dp1 \quad (1), \text{ and}$$

$$Lb2 > Lp2 \quad (2),$$

where Dp1 is the diameter of that end of the pin taper guide surface which is closer to the tip of the pin; Dp2 is the diameter of the intersecting line of a plane extending from the pin taper guide surface and a plane extending from the taper surface of the first pin sealing surface; Lp2 is the length of that portion of the threaded connection as measured in a pipe-axis direction which starts with the tip of the pin and ends with the intersecting line of the plane extending from the pin taper guide surface and the plane extending from the taper surface of the first pin sealing surface; Db2 is the diameter of the intersecting line of a plane extending from the box taper guide surface and a plane extending from the taper surface of the first box sealing surface; and Lb2 is the length as measured in the pipe-axis direction which starts with the interior end of the box and ends with the intersecting line of the plane extending from the box taper guide surface and the plane extending from the taper surface of the first box sealing surface.

The buffer surface has a length of 0.75 mm or larger as measured in the pipe-axis direction. The buffer surface is located outward of an imaginary plane as determined along a radial direction with respect to the threaded connection. The imaginary plane is formed by the plane extending from the box taper guide surface and the plane extending from the first box sealing surface.

In the above-described embodiment, the taper guide surfaces are constructed in such a way that the taper angle of the taper surface of each sealing surface is larger than the taper angle of each taper guide surface and that expressions (1) and (2) are satisfied. Thus, before the sealing surfaces begin to slide against each other, the taper guide surfaces interfere with each other and the pipe axis of the pin is aligned with the pipe axis of the box. This will prevent eccentric contact between the sealing surfaces. Further, the distance along which the sealing surfaces slide against each other will be reduced by the amount of interference of the taper guide surfaces. This will prevent galling on the sealing surfaces during make-up.

In the above-described embodiment, a buffer surface is present between the box taper guide surface and box sealing surface. Thus, the box sealing surface is separated from the box taper guide surface. Thus, even when the box taper guide surface is damaged or deformed during make-up, this damage or deformation is prevented from reaching the box sealing surface. This will prevent the box sealing surface from causing the pin sealing surface to wear out, thereby preventing galling.

In the above-described embodiment, expressions (1) and (2) are satisfied such that the pin taper guide surface faces the box taper guide surface after completion of make-up, these surfaces being separated by a clearance. Thus, when the connection has been made up, the rigidity of the pin nose amplifies the elastic recovery of the pin sealing surface, thereby improving the contact surface pressure between the sealing surfaces. This will provide high sealing performance.

Thus, the above-described embodiment prevents galling on the sealing surfaces during make-up while providing high sealing performance after completion of make-up.

The first pin shoulder surface may include a pin main shoulder surface and a pin auxiliary shoulder surface. The pin auxiliary shoulder surface is disposed adjacent to an outer periphery of the pin main shoulder surface. The first box shoulder surface may include a box main shoulder surface and a box auxiliary shoulder surface. The box main shoulder surface is provided to correspond to the pin main shoulder surface. The box main shoulder surface is in contact with the pin main shoulder surface when the connection has been made up. The box auxiliary shoulder surface is provided to correspond to the pin auxiliary shoulder surface. The box auxiliary shoulder surface is contactable with the pin auxiliary shoulder surface when the connection has been made up. When the connection has been made up, the pin auxiliary shoulder surface and the box auxiliary shoulder surface may not be in contact with each other.

The pin may further include a second pin sealing surface. The second pin sealing surface is provided on the outer periphery of the pin and located, as determined along the pipe-axis direction, in a middle thereof or at an end thereof adjacent to the steel pipe body. The box may further include a second box sealing surface. The second box sealing surface is provided on the inner periphery of the box to correspond to the second pin sealing surface. The second box sealing surface is in contact with the second pin sealing surface when the connection has been made up.

The pin may further include a second pin shoulder surface. The box may further include a second box shoulder surface. The second pin shoulder surface is located, as determined along the pipe-axis direction, in a middle thereof or at an end thereof adjacent to the steel pipe body. The second pin shoulder surface crosses the pipe-axis direction. The second box shoulder surface is disposed to correspond to the second pin shoulder surface. The second box shoulder surface is in contact with the second pin shoulder surface when the connection has been made up.

At least one of the first pin sealing surface and the first box sealing surface may further include a curved surface. The curved surface is provided to be contiguous to the taper surface. The curved surface has one or more curvatures.

The buffer surface may include a curved surface. The curved surface is provided to be contiguous to the box taper guide surface and the first box sealing surface. The curved surface has one or more curvatures.

The buffer surface may have a length of 2 mm or smaller as measured in the pipe-axis direction.

Embodiments will now be specifically described with reference to the drawings. The same and corresponding elements in the drawings are labeled with the same characters, and the same description will not be repeated. For ease of explanation, the drawings may show elements in a simplified or schematic manner, or some elements may not be shown.

First Embodiment

[Construction of Threaded Connection]
(Overall Construction)

Figure 2:
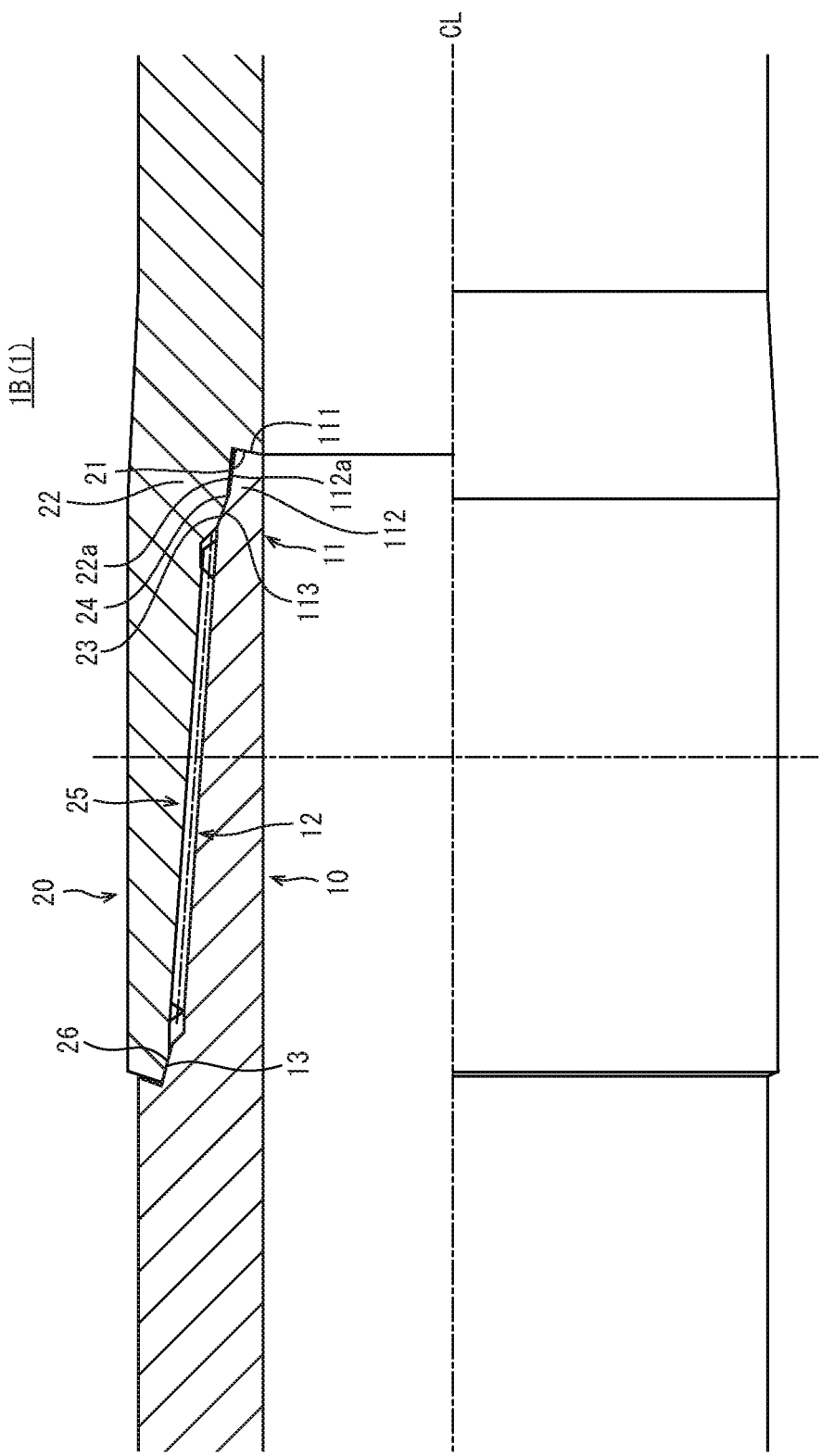
FIG. 2 is a schematic longitudinal cross-sectional view of an integral-type threaded connection for steel pipe according to the first embodiment.

FIGS. 1 and 2 show schematic longitudinal cross-sectional views of threaded connections for steel pipe 1A and 1B, respectively, according to a first embodiment. The threaded connection 1A shown in FIG. 1 is a coupling-type threaded connection. The threaded connection 1B shown in FIG. 2 is an integral-type threaded connection. In the following description, the threaded connections 1A and 1B may be collectively referred to as threaded connection 1 when no distinction is made.

As shown in FIGS. 1 and 2, the threaded connection 1 includes a tubular pin 10 and a tubular box 20. The pin 10 is inserted into the box 20 such that the pin 10 and box 20 are made up.

The pin 10 is provided at an end of the steel pipe body. Steel pipe body refers to portions of the steel pipe including the pin 10 that are not within the box 20 after insertion. For ease of explanation, the direction toward the tip of the pin 10 may be referred to as inward direction or direction toward the interior or the forward direction or direction toward the front, and the direction toward the steel pipe body may be referred to as outward direction or direction toward the exterior or rearward direction or direction toward the rear, all as determined along the pipe-axis direction of the threaded connection 1.

The pin 10 includes a pin lip 11 and a male thread 12. The pin lip 11 constitutes a tip portion of the pin. The male thread 12 is located closer to the steel pipe body than the pin lip 11 is.

The pin lip 11 includes a pin shoulder surface 111, a nose 112, and a pin sealing surface 113. The pin shoulder surface 111, nose 112 and pin sealing surface 113 are arranged in this order as it goes toward the exterior as determined along the pipe-axis direction.

The pin shoulder surface 111 is provided on the tip of the pin 10. The pin shoulder surface 111 may include a pin main shoulder surface and a pin auxiliary shoulder surface, discussed further below.

The nose 112 is located closer to the male thread 12 than the pin shoulder surface 111 is. The nose 112 includes a pin taper guide surface 112a on its periphery. The pin taper guide surface 112a is a taper surface having a diameter that decreases toward the tip of the pin 10. That is, the pin taper guide surface 112a is formed by the periphery of a truncated cone whose axis is represented by the pipe axis CL.

The pin sealing surface 113 is located closer to the male thread 12 than the nose 112 is. The pin sealing surface 113 includes a taper surface having a diameter that decreases toward the tip of the pin 10. The taper surface of the pin sealing surface 113 will be described in detail further below.

The male thread 12 is located outward of the pin lip 11 as determined along the pipe-axis direction. The male thread 12 is provided on the outer periphery of the pin 10. The male thread 12 is constituted by a tapered thread.

The box 20 includes a box shoulder surface 21, a nose-receiving portion 22, a box sealing surface 23, a buffer surface 24, and a female thread 25.

The box shoulder surface 21 is provided on the interior end of the box 20 to correspond to the pin shoulder surface 111. When the connection has been made up, the box shoulder surface 21 is in contact with the pin shoulder surface 111 and, together with the pin shoulder surface 111, forms a shoulder assembly. The pin shoulder surface 111 and box shoulder surface 21 serve as a stop for limiting screw-in of the pin 10. The pin shoulder surface 111 and box shoulder surface 21 serve to generate a thread-tightening axial force inside the connection.

The nose-receiving portion 22 is provided on the box 20 to correspond to the nose 112 of the pin 10. The nose-receiving portion 22 is located outward of the box shoulder surface 21 as determined along the pipe-axis direction. The nose-receiving portion 22 includes a box taper guide surface 22a on its inner periphery.

The box taper guide surface 22a is a taper surface having a diameter that decreases toward the interior end of the box 20. That is, the box taper guide surface 22a is formed by the inner periphery of a truncated cone whose axis is represented by the pipe axis CL.

The box taper guide surface 22a and pin taper guide surface 112a have an amount of interference. The box taper guide surface 22a is in contact with the pin taper guide surface 112a during make-up of the pin 10 and box 20. After completion of make-up, the box taper guide surface 22a is not in contact with the pin taper guide surface 112a.

The box sealing surface 23 is located outward of the nose-receiving portion 22 as determined along the pipe-axis direction. The box sealing surface 23 is provided on the inner periphery of the box 20 to correspond to the pin sealing surface 113. The box sealing surface 23 and pin sealing surface 113 have an amount of interference. When the connection has been made up, the pin sealing surface 113 and box sealing surface 23 fittingly adhere to each other to achieve an interference fit. When the connection has been made up, the pin sealing surface 113 and box sealing surface 23 form a seal that uses metal-to-metal contact.

The buffer surface 24 is provided on the inner periphery of the box 20. The buffer surface 24 constitutes the border portion of the inner peripheral surface of the box 20 between the box taper guide surface 22a and box sealing surface 23.

The female thread 25 is provided on the inner periphery of the box 20 to correspond to the male thread 12. The female thread 25 is constituted by a tapered thread that can engage the tapered thread constituting the male thread 12. When the connection has been made up, the female thread 25, together with the male thread 12, forms a thread assembly. The threads are preferably single-start or double-start threads.

The pin 10 of the threaded connection 1B shown in FIG. 2 further includes a pin sealing surface 13. The pin sealing surface 13 is provided on the outer periphery of the pin 10 and is located at the end of the pin 10 that is adjacent to the steel pipe body.

The box 20 of the threaded connection 1B further includes a box sealing surface 26 to correspond to the pin sealing surface 13. The pin sealing surface 13 and box sealing surface 26 have an amount of interference. As such, when the connection has been made up, the pin sealing surface 13 and box sealing surface 26 fittingly adhere to each other to achieve an interference fit. When the connection has been made up, the pin sealing surface 13 and box sealing surface 26 form a seal that uses metal-to-metal contact.

(Construction of Interior End of Threaded Connection)

Figure 3:
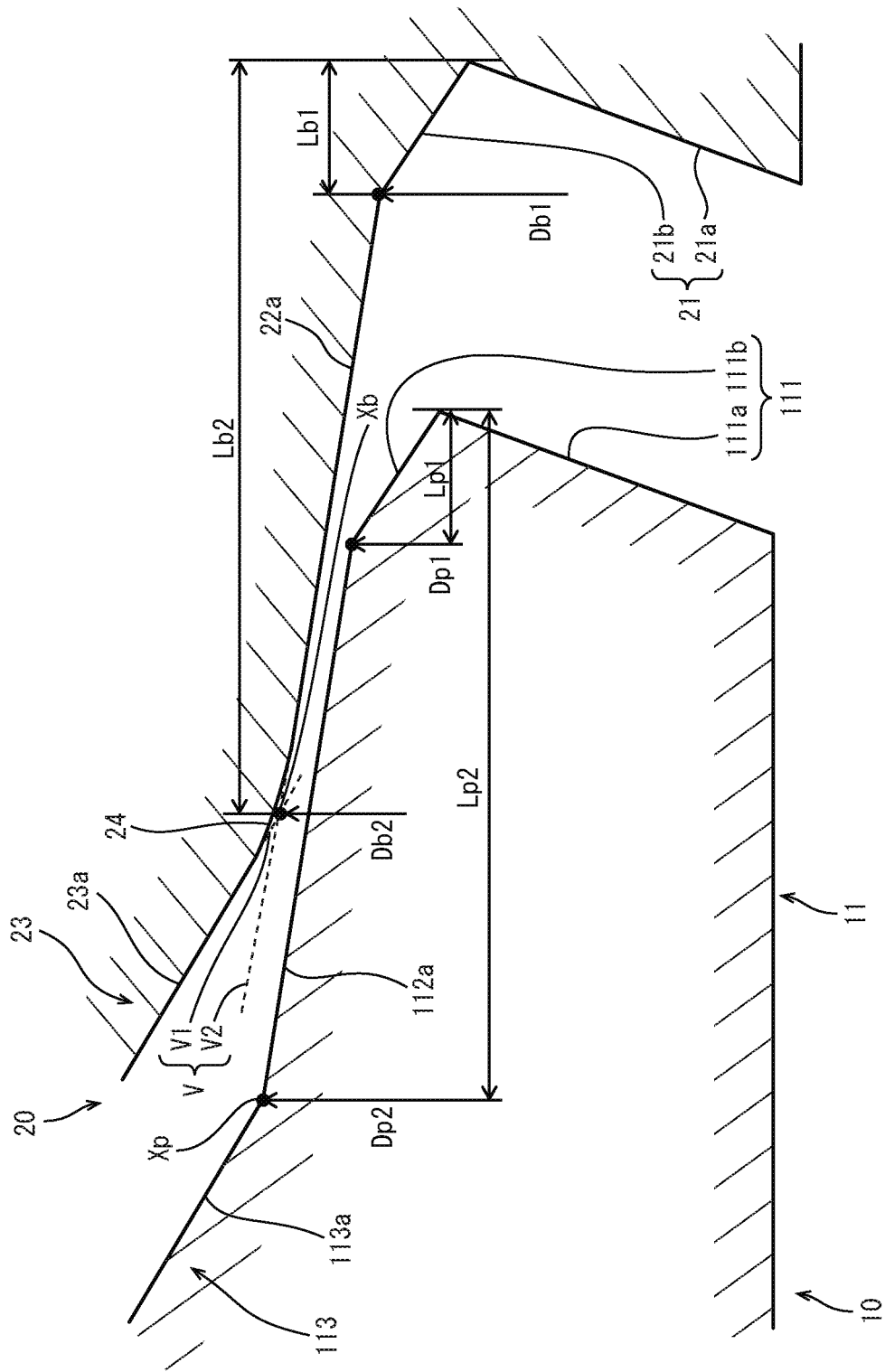
FIG. 3 is an enlarged view of the interior end portion, as determined along the pipe-axis direction, of the threaded connection as found when the connection is not made up.

FIG. 3 is an enlarged view of the interior end portion, as determined along the pipe-axis direction, of the threaded connection 1 shown in FIGS. 1 and 2.

As shown in FIG. 3, according to the present embodiment, the pin shoulder surface 111 includes a pin main shoulder surface 111a and a pin auxiliary shoulder surface 111b. The box shoulder surface includes 21 a box main shoulder surface 21a and a box auxiliary shoulder surface 21b.

The pin main shoulder surface 111a is a toroidal surface crossing the pipe-axis direction of the threaded connection 1. According to the present embodiment, the pin main shoulder surface 111a is inclined such that its outer periphery is located inward of its inner periphery as determined along the pipe-axis direction.

The pin auxiliary shoulder surface 111b is a toroidal surface provided adjacent to the outer periphery of the pin main shoulder surface 111a. The pin auxiliary shoulder surface 111b crosses radial directions with respect to the threaded connection 1. The pin auxiliary shoulder surface 111b has an inclination opposite to that of the pin main shoulder surface 111a. That is, the pin auxiliary shoulder surface 111b is inclined such that its outer periphery is located outward of its inner periphery as determined along the pipe-axis direction.

The box main shoulder surface 21a and box auxiliary shoulder surface 21b are toroidal surfaces provided on the box 20 to correspond to the pin main shoulder surface 111a and pin auxiliary shoulder surface 111b, respectively. The box main shoulder surface 21a is inclined such that its outer periphery is located inward of its inner periphery as determined along the pipe-axis direction to correspond to the pin main shoulder surface 111a. The box auxiliary shoulder surface 21b has an inclination opposite to that of the box main shoulder surface 21a. The box auxiliary shoulder surface 21b is inclined such that its outer periphery is located outward of its inner periphery as determined along the pipe-axis direction to correspond to the pin auxiliary shoulder surface 111b.

The pin main shoulder surface 111a and box main shoulder surface 21a are in contact with each other when the connection has been made up. On the other hand, the pin auxiliary shoulder surface 111b and box auxiliary shoulder surface 21b are constructed to be contactable when the connection has been made up, but do not need to be in contact with each other in a normal state with the connection made up. The pin auxiliary shoulder surface 111b and box auxiliary shoulder surface 21b may contact each other if, for example, a high compression load is applied to the threaded connection 1 or an excessive tightening torque is applied. As the pin auxiliary shoulder surface 111b contacts the box auxiliary shoulder surface 21b, the pin lip 11 is prevented from deforming in a way that increases its diameter.

The pin shoulder surface 111 does not need to include the pin auxiliary shoulder surface 111b. In such implementations, the box shoulder surface 21 does not include the box auxiliary shoulder surface 21b.

The pin sealing surface 113 includes a taper surface 113a. The taper surface 113a has a diameter that decreases toward the tip of the pin 10. That is, the taper surface 113a is formed by the periphery of a truncated cone whose axis is represented by the pipe axis CL. When the connection is not made up, the taper surface 113a has a taper angle that is larger than the taper angle of the pin taper guide surface 112a.

The taper surface 113a of the pin sealing surface 113 is preferably connected to the pin taper guide surface 112a via a curved surface having one or more curvatures. Similarly, it is preferable to provide a curved surface having one or more curvatures between the taper surface 113a and male thread 12 (FIGS. 1 and 2). In such implementations, both ends, as determined along the pipe-axis direction, of the pin sealing surface 113 are formed by curved surfaces. Curved surface having one or more curvatures means a surface formed by, in a cross-sectional view of the pin 10 taken along a plane containing the pipe axis CL (i.e. longitudinal cross-sectional view), one or more curved lines selected from an arc, an elliptic arc and a parabola. Alternatively, the pin sealing surface 113 may be composed of the taper surface 113a only.

The box sealing surface 23 includes a taper surface 23a. The taper surface 23a has a diameter that decreases toward the interior end of the box 20. That is, the taper surface 23a is formed by the periphery of a truncated cone whose axis is represented by the pipe axis CL. When the connection is not made up, the taper angle of the taper surface 23a is equal to the taper angle of the taper surface 113a of the pin sealing surface 113, and larger than the taper angle of the box taper guide surface 22a. When the connection is not made up, the taper angle of the box taper guide surface 22a is equal to the taper angle of the pin taper guide surface 112a.

The taper angles of the taper surfaces 113a and 23a are preferably larger than the taper angles of the pin and box taper guide surfaces 112a and 22a by 2° to 25°, and more preferably by 3° to 15°.

The buffer surface 24 is provided between the box taper guide surface 22a and the taper surface 23a of the box sealing surface 23. The buffer surface 24 has a length of 0.75 mm or larger. The length of the buffer surface 24 is preferably not larger than 2 mm. The length of the buffer surface 24 is defined as the distance, as determined along the pipe-axis direction, between the rear end of the box taper guide surface 22a and the front end of the taper surface 23a.

The buffer surface 24 is located outward of an imaginary surface V as determined along radial directions with respect to the box 20. The imaginary surface V is composed of extension planes V1 and V2. The extension plane V1 is an imaginary surface extending from the box taper guide surface 22a generally toward the box sealing surface 23. The extension plane V2 is an imaginary surface extending from the taper surface 23a of the box sealing surface 23 generally toward the box taper guide surface 22a. If the diameter of the buffer surface 24 and the diameter of the imaginary plane V are compared at the same position along the pipe-axis direction, the diameter of the buffer surface 24 is always larger than the diameter of the imaginary plane V. The construction of the buffer surface 24 will be described in detail further below.

In FIG. 3, the diameter of the end of the pin taper guide surface 112a adjacent to the tip of the pin 10 (i.e. front end) is denoted by Dp1; and the diameter of the intersecting line Xp of an extension plane extending from the pin taper guide surface 112a generally toward the pin sealing surface 113 and an extension plane extending from the taper surface 113a of the pin sealing surface 113 generally toward the pin taper guide surface 112a is denoted by Dp2. Lp1 is the distance between the tip of the pin 10 and the front end of the pin taper guide surface 112a as measured in the pipe-axis direction; and Lp2 is the distance between the tip of the pin 10 and the intersecting line Xp as measured in the pipe-axis direction. However, in FIG. 3, the curved surface between the pin taper guide surface 112a and taper surface 113a is omitted; as such, the border between the pin taper guide surface 112a and taper surface 113a represents the intersecting line Xp. Dp1, Dp2, Lp1 and Lp2 are all dimensions as measured when the connection is not made up.

In FIG. 3, the diameter of the end of the box taper guide surface 22a adjacent to the box shoulder surface 21 (i.e. front end) is denoted by Db1; and the diameter of the intersecting line Xb of the extension planes V1 and V2 is denoted by Db2. Lb1 is the distance between the interior end of the box 20 and the front end of the box taper guide surface 22a as measured in the pipe-axis direction; and Lb2 is the distance between the interior end of the box 20 and the intersecting line Xb as measured in the pipe-axis direction. Db1, Db2, Lb1 and Lb2 are all dimensions as measured when the connection is not made up.

The threaded connection 1 according to the present embodiment is constructed so as to satisfy the following expressions, (1) and (2):

$$Dp2 > Db2 > Dp1 \quad (1), \text{ and}$$

$$Lb2 > Lp2 \quad (2),$$

Figure 4:
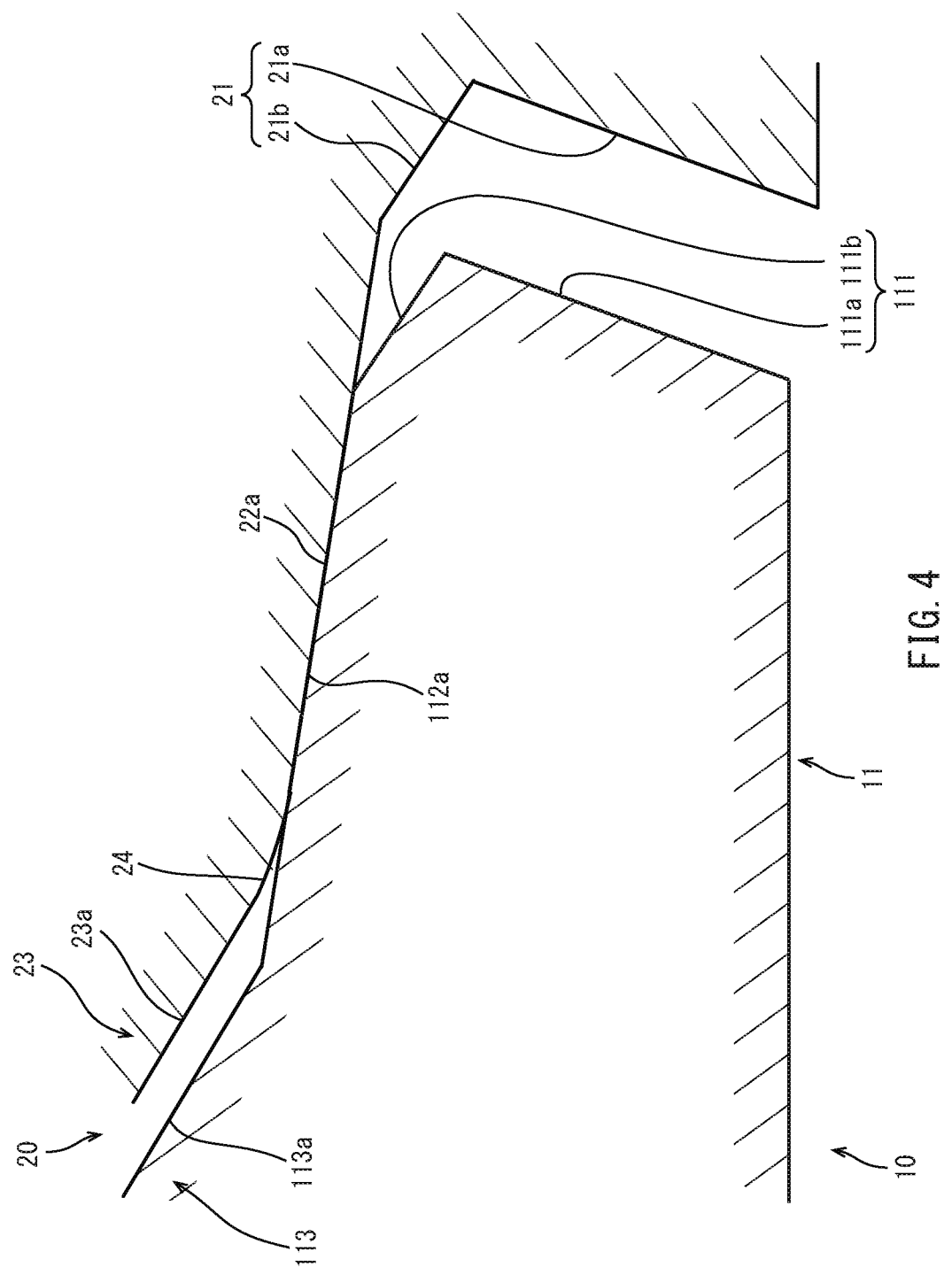
FIG. 4 is an enlarged view of the interior end portion, as determined along the pipe-axis direction, of the threaded connection during make-up.
Figure 5:
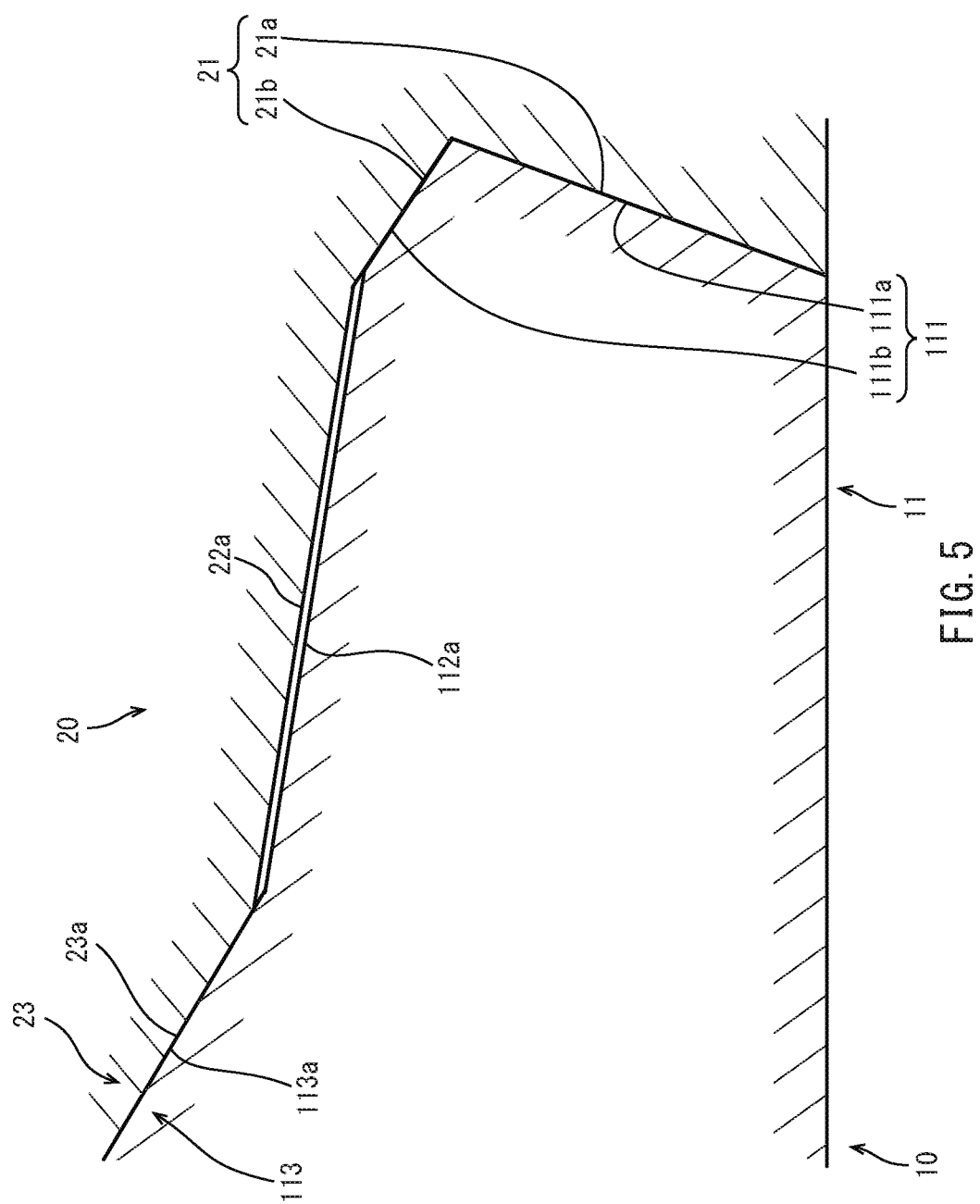
FIG. 5 is an enlarged view of the interior end portion, as determined along the pipe-axis direction, of the threaded connection after completion of make-up.

If expressions (1) and (2) are satisfied, as shown in FIG. 4, during a make-up process, the pin taper guide surface 112a and box taper guide surface 22a begin to slide against each other before the pin sealing surface 113 and box sealing surface 23 begin to slide against each other. After completion of make-up, as shown in FIG. 5, the pin sealing surface 113 and box sealing surface 23 are in contact with each other, while the pin taper guide surface 112a and box taper guide surface 22a face each other, with a clearance present therebetween.

Within expression (1), Db2 is preferably not smaller than 97% and smaller than 100% of Dp2, and more preferably not smaller than 99% and smaller than 100% of Dp2. Dp1 is preferably not smaller than 97% and smaller than 100% of Db2, and more preferably not smaller than 99% and smaller than 100% of Db2.

Within expression (2), Lp2 is preferably not smaller than 40% and smaller than 100% of Lb2, and more preferably not smaller than 60% and smaller than 95% of Lb2.

Further, it is preferable that the threaded connection 1 according to the present embodiment satisfies the following expression, (3):

$$Lb1 > Lp1 \quad (3).$$

Now, the relationship between the amount of taper guide interference, δg, and the amount of seal interference, δs, will be described. The amount of taper guide interference δg is the amount of interference between the pin taper guide surface 112a and the box taper guide surface 22a. The amount of seal interference δs is the amount of interference between the pin sealing surface 113 and box sealing surface 23.

The amount of taper guide interference δg is the maximum amount of interference between the pin taper guide surface 112a and box taper guide surface 22a found when they are in contact with and slide against each other. In other words, the amount of taper guide interference δg is the amount of interference that has been introduced between the pin taper guide surface 112a and box taper guide surface 22a directly before the pin sealing surface 113 and box sealing surface 23 begin to slide against each other. The amount of interference δg is substantially equal to Dp2 minus Db2 (=Dp2−Db2).

The amount of seal interference δs is the amount of interference present between the pin sealing surface 113 and box sealing surface 23 upon completion of make-up, i.e. when the pin shoulder surface 111 has abutted the box shoulder surface 21. In other words, supposing that the tip of the pin 10 and the interior end of the box 20 represent reference positions, the amount of seal interference δs is substantially equal to the distance between the diameter of the pin sealing surface 113 and the diameter of the box sealing surface 23 as measured at the same distance from the respective reference positions as measured in the pipe-axis direction (i.e. when the connection is not made up).

According to the present embodiment, the amount of taper guide interference δg and the amount of seal interference δs satisfy the relationship of the following equation, (5):

$$\delta s > \delta g \qquad (5).$$

The amount of taper guide interference δg is preferably not smaller than 50% and not larger than 95% of the amount of seal interference δs, and more preferably not smaller than 70% and not larger than 90% of the amount of seal interference.

(Construction of Buffer Surface)

As discussed above, the buffer surface 24 is located between the box taper guide surface 22a and the taper surface 23a of the box sealing surface 23 and outward of the imaginary surface V. The buffer surface 24 preferably includes a curved surface having one or more curvatures. The curved surface is a surface formed by, in a cross-sectional view of the box 20 taken along a plane containing the pipe axis CL (i.e. longitudinal cross-sectional view), one or more curved lines selected from an arc, an elliptic arc and a parabola.

Figure 6:
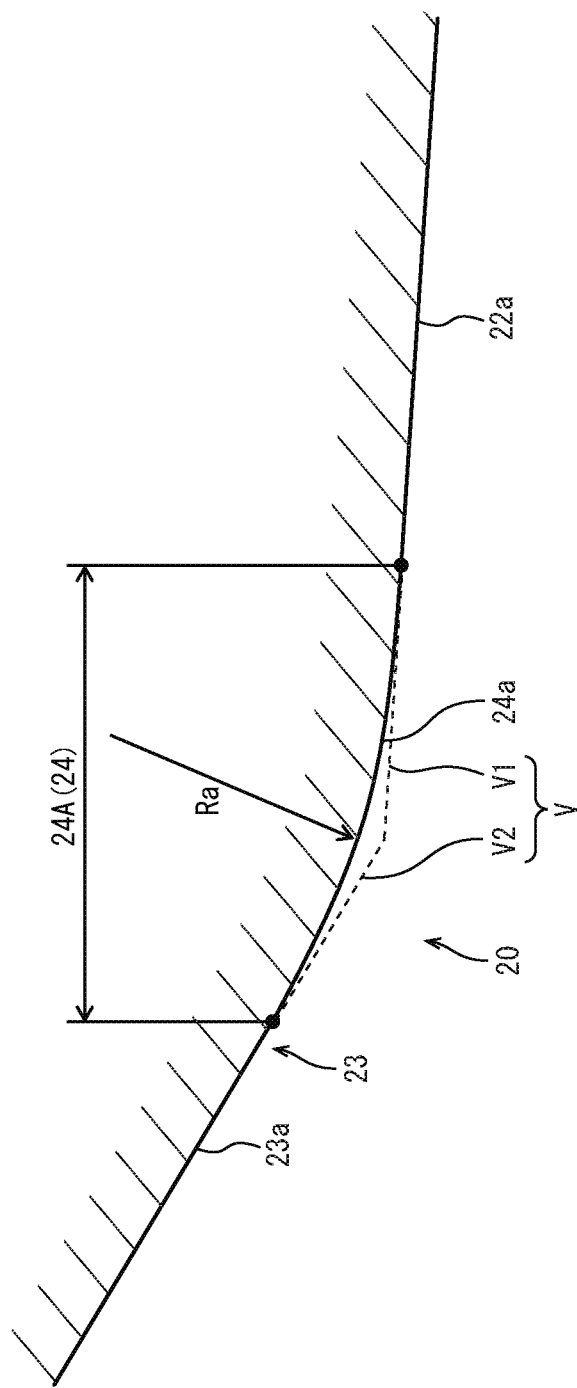
FIG. 6 illustrates a geometry of the buffer surface of the threaded connection.
Figure 7:
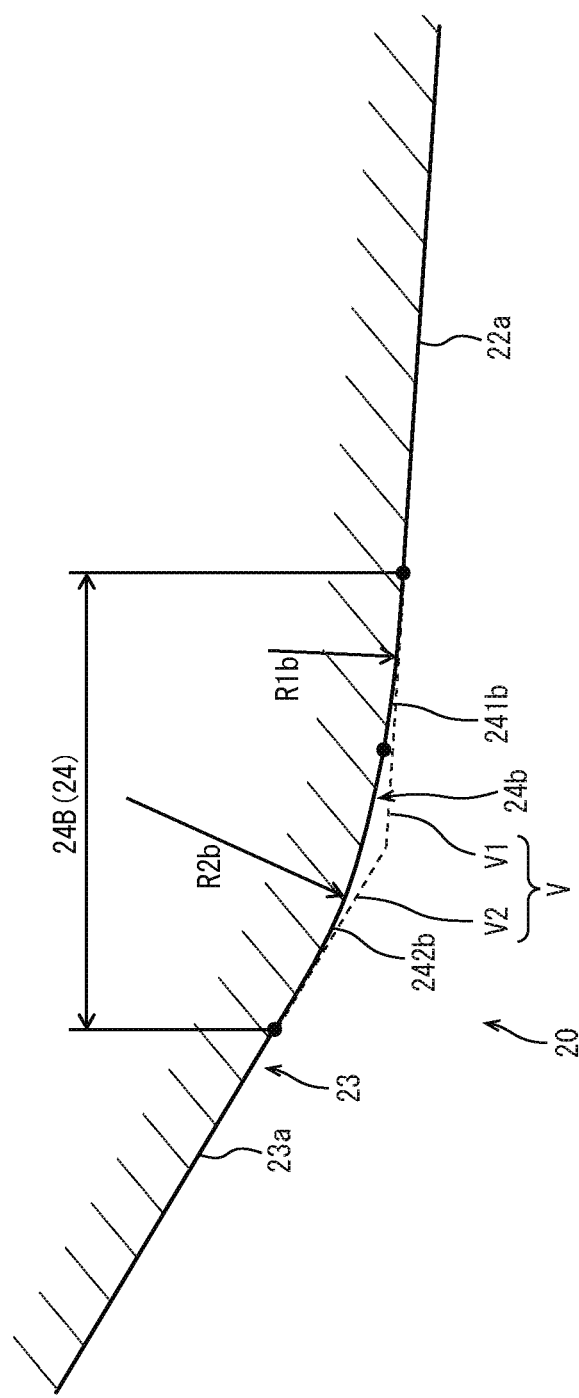
FIG. 7 illustrates another geometry of the buffer surface of the threaded connection.
Figure 8:
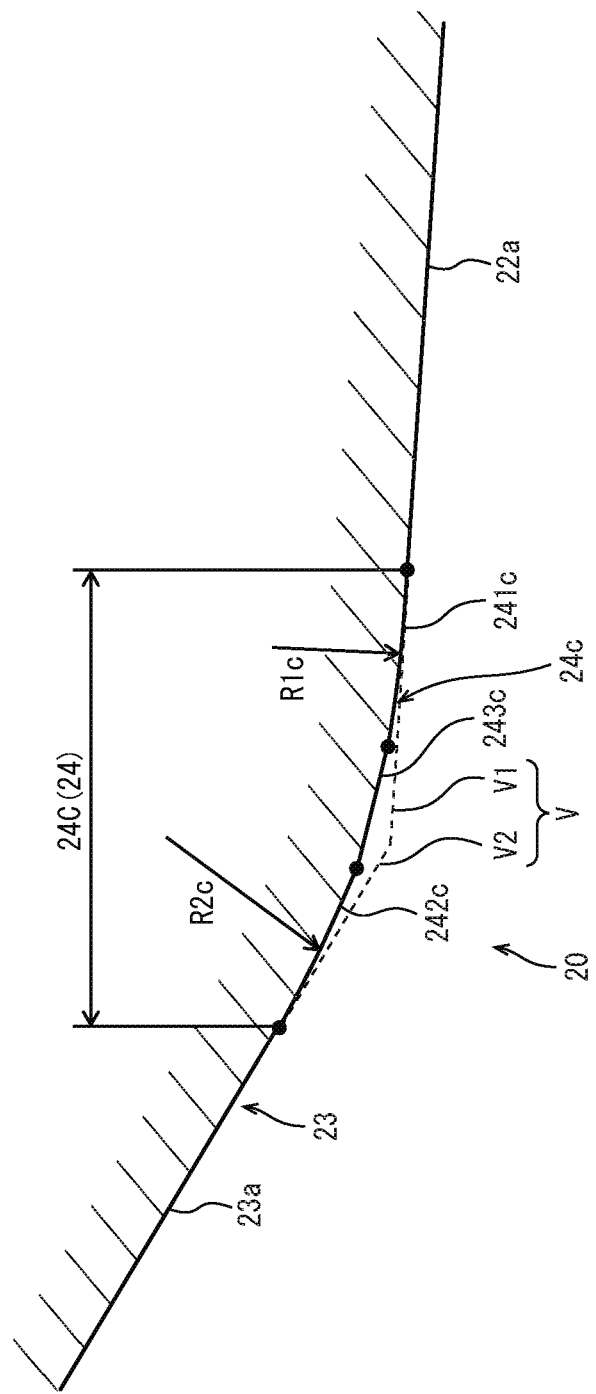
FIG. 8 illustrates yet another geometry of the buffer surface of the threaded connection.

FIGS. 6 to 8 show buffer surfaces 24A, 24B and 24C with different geometries. The buffer surfaces 24A, 24B and 24C may be collectively referred to as buffer surface 24 when no distinction is made.

The buffer surface 24A shown in FIG. 6 is composed of a curved surface 24a having a curvature Ra. That is, the buffer surface 24A is formed by a single arc in a longitudinal cross-sectional view of the box 20. The inverse of the curvature Ra, i.e. the radius of curvature of the curved surface 24a, is preferably not smaller than 1 mm.

The buffer surface 24A formed by the curved surface 24a is contiguous to the box taper guide surface 22a and the taper surface 23a of the box sealing surface 23. That is, the buffer surface 24 is smoothly connected to the box taper guide surface 22a and taper surface 23a. For example, in a longitudinal cross-sectional view of the box 20, the box taper guide surface 22a and its extension plane V1 are tangent to the buffer surface 24 at its front end. In a longitudinal cross-sectional view of the box 20, the taper surface 23a and its extension plane V2 are tangent to the buffer surface 24 at its rear end.

The rear end of the buffer surface 24A may be interpreted as the front end of the box sealing surface 23. That is, in the implementation shown in FIG. 6, a portion (i.e. rear end) of the curved surface 24a may be interpreted as a curved surface included in the buffer surface 24A and, at the same time, as a curved surface included in the box sealing surface 23.

The buffer surface 24B shown in FIG. 7 is formed by a curved surface 24b having two curvatures R1b and R2b. The curved surface 24b is a complex surface composed of a curved subsurface 241b having a curvature R1b and a curved subsurface 242b having a curvature R2b connected together. The inverses of the curvatures R1b and R2b, i.e. the radii of curvature of the curved subsurfaces 241b and 242b are preferably not smaller than 1 mm.

Similar to the buffer surface 24A shown in FIG. 6, the buffer surface 24B is smoothly connected to the box taper guide surface 22a and the taper surface 23a of the box sealing surface 23. The rear end of the curved surface 24b forming part of the buffer surface 24B may be interpreted as a curved surface included in the buffer surface 24B and, at the same time, as a curved surface included in the box sealing surface 23.

The buffer surface 24C shown in FIG. 8 is a complex surface 24c formed by curved subsurfaces 241c and 242c and a taper surface 243c. The curved surface 241c has a curvature R1c. The curved surface 242c has a curvature R2c that is different from the curved surface R1c. The inverses of the curvatures R1c and R2c, i.e. the radii of curvature of the curved subsurfaces 241c and 242c are preferably not smaller than 1 mm.

The curved subsurface 241c is smoothly connected to the box taper guide surface 22a. The curved subsurface 242c is smoothly connected to the taper surface 23a of the box sealing surface 23. Some or all of the curved subsurface 242c may be interpreted as a curved surface included in the buffer surface 24C and, at the same time, as a curved surface included in the box sealing surface 23. The taper surface 243c is located between the curved subsurfaces 241c and 242c.

[Effects]

In the threaded connection 1 according to the present embodiment, the taper angles of the taper surface 113a of the pin sealing surface 113 and the taper surface 23a of the box sealing surface 23 are larger than the taper angles of the pin taper guide surface 112a and box taper guide surface 22a. Further, the threaded connection 1 is constructed so as to satisfy expressions (1) and (2), provided above. With this construction, during a make-up process, the pin taper guide surface 112a and box taper guide surface 22a begin to slide against each other such that the pipe axes of the pin 10 and box 20 are aligned before the pin sealing surface 113 and box sealing surface 23 begin to slide against each other. This will prevent eccentric contact between the pin sealing surface 113 and box sealing surface 23 during make-up. This will prevent galling on the pin and box sealing surfaces 113 and 23 during make-up.

In a conventional threaded connection, the distance along which the pin and box sealing surfaces slide against each other is about δs·πDs/2Ptanθ, where P is the thread pitch of the threads, θ is the slope angle of the seal (=taper angle/2), and Ds is the representative diameter of the seal. In contrast, in the threaded connection 1 according to the present embodiment, the distance along which the pin sealing surface 113 and box sealing surface 23 slide against each other decreases to (δs−δg)·πDs/2Ptan θ as the pin taper guide surface 112a and box taper guide surface 22a are introduced. That is, in the threaded connection 1, the distance along which the pin sealing surface 113 and box sealing surface 23 slide against each other during make-up decreases by the amount of taper guide interference δg.

For example, if the amount of taper guide interference δg is a half of the amount of seal interference δs, the distance along which the pin sealing surface 113 and box sealing surface 23 slide against each other during make-up becomes about a half, thereby reducing the risk of galling. On the other hand, after completion of make-up, a clearance of (δs−δg)/2 is introduced between the pin taper guide surface 112a and box taper guide surface 22a. This will produce an adherence surface pressure at the seal similar to the threaded connection including a conventional nose, thereby providing high sealing performance.

In the present embodiment, a buffer surface 24 is present on a border portion between the box taper guide surface 22a and box sealing surface 23 such that the box sealing surface 23 is separated from the box taper guide surface 22a. Thus, even if the box taper guide surface 22a is damaged or deformed during make-up, the damage or deformation is prevented from reaching the box sealing surface 23. This will prevent the box sealing surface 23 from wearing down the pin sealing surface 113, thereby preventing galling.

Thus, the threaded connection 1 according to the present embodiment will prevent galling on the pin sealing surface 113 and box sealing surface 23 during make-up while providing high sealing performance after completion of make-up.

In the threaded connection 1 according to the present embodiment, the pin shoulder surface 111 includes a pin main shoulder 111a and a pin auxiliary shoulder 111b. The box shoulder surface 21 includes a box main shoulder surface 21a and a box auxiliary shoulder surface 21b. The pin main shoulder surface 111a and box main shoulder surface 21a are in contact with each other after completion of make-up, limiting screw-in of the pin 10 into the box 20. On the other hand, the pin auxiliary shoulder surface 111b and box auxiliary shoulder surface 21b do not need to be always in contact with each other when the connection has been made up. The pin auxiliary shoulder surface 111b and box auxiliary shoulder surface 21b are disposed to cross radial directions of the threaded connection 1, and thus may contact each other when a high compression load is applied to the threaded connection 1 or an excessive tightening torque is applied to cause the pin lip 11 to move outward in a radial direction. This will prevent the pin lip 11 from deforming outward in a radial direction.

Second Embodiment

Figure 9:
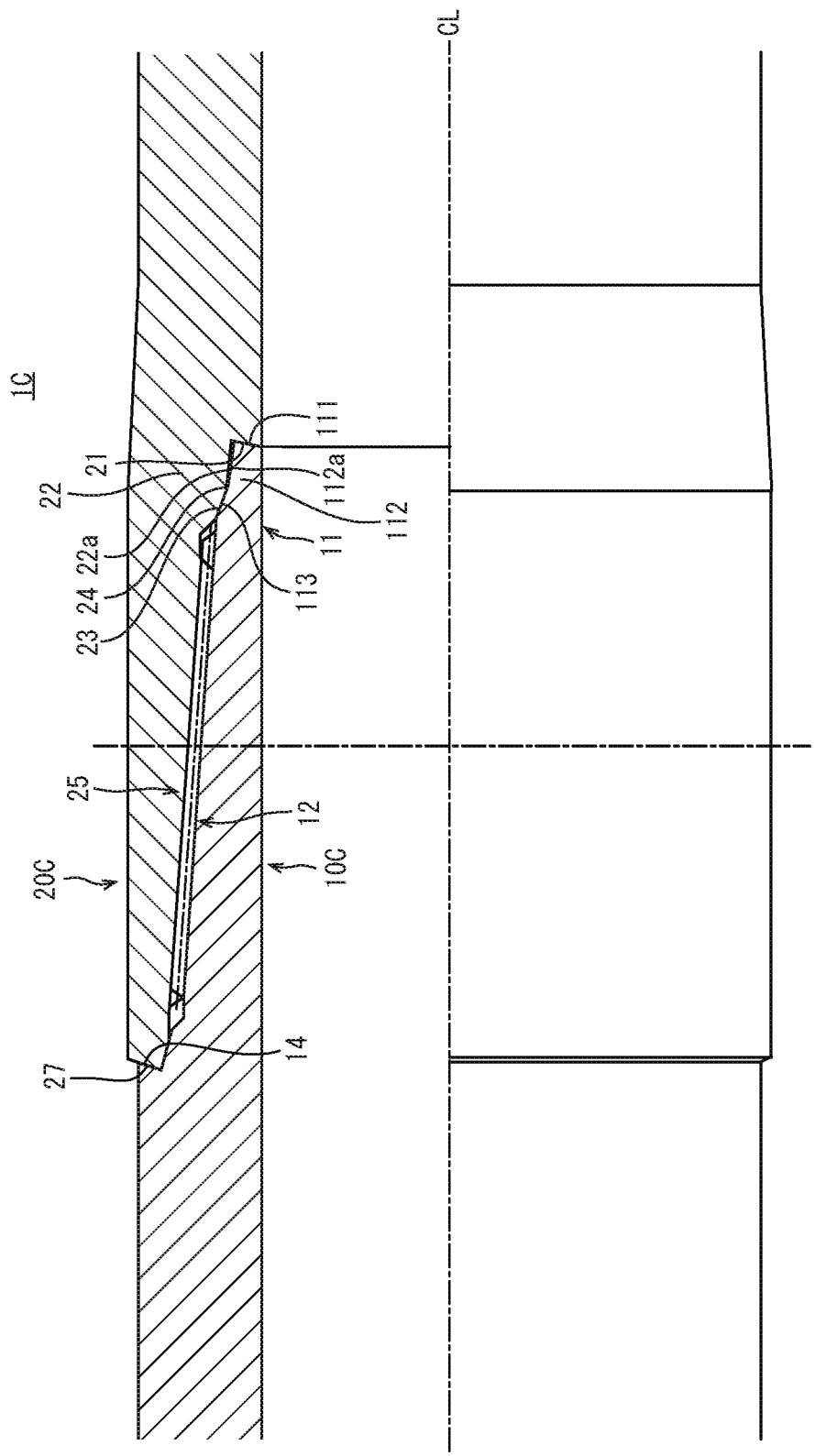
FIG. 9 is a schematic longitudinal cross-sectional view of a threaded connection for steel pipe according to a second embodiment.

FIG. 9 is a schematic longitudinal cross-sectional view of a threaded connection 1C for steel pipe according to a second embodiment. The threaded connection 1C shown in FIG. 9 is an integral-type threaded connection, but may be a coupling-type threaded connection.

In the threaded connection 1C, the pin 10C and box 20C include a pin shoulder surface 14 and a box shoulder surface 27, respectively. The pin shoulder surface 14 is located on the end of the pin 10 that is adjacent to the steel pipe body. The box shoulder surface 27 is provided on the box 20 to correspond to the pin shoulder surface 14. The pin and box shoulder surfaces 14 and 27 are toroidal surfaces crossing the pipe-axis direction of the threaded connection 1C. The pin and box shoulder surfaces 14 and 27 are in contact with each other when the connection has been made up to form a shoulder assembly.

Third Embodiment

Figure 10:
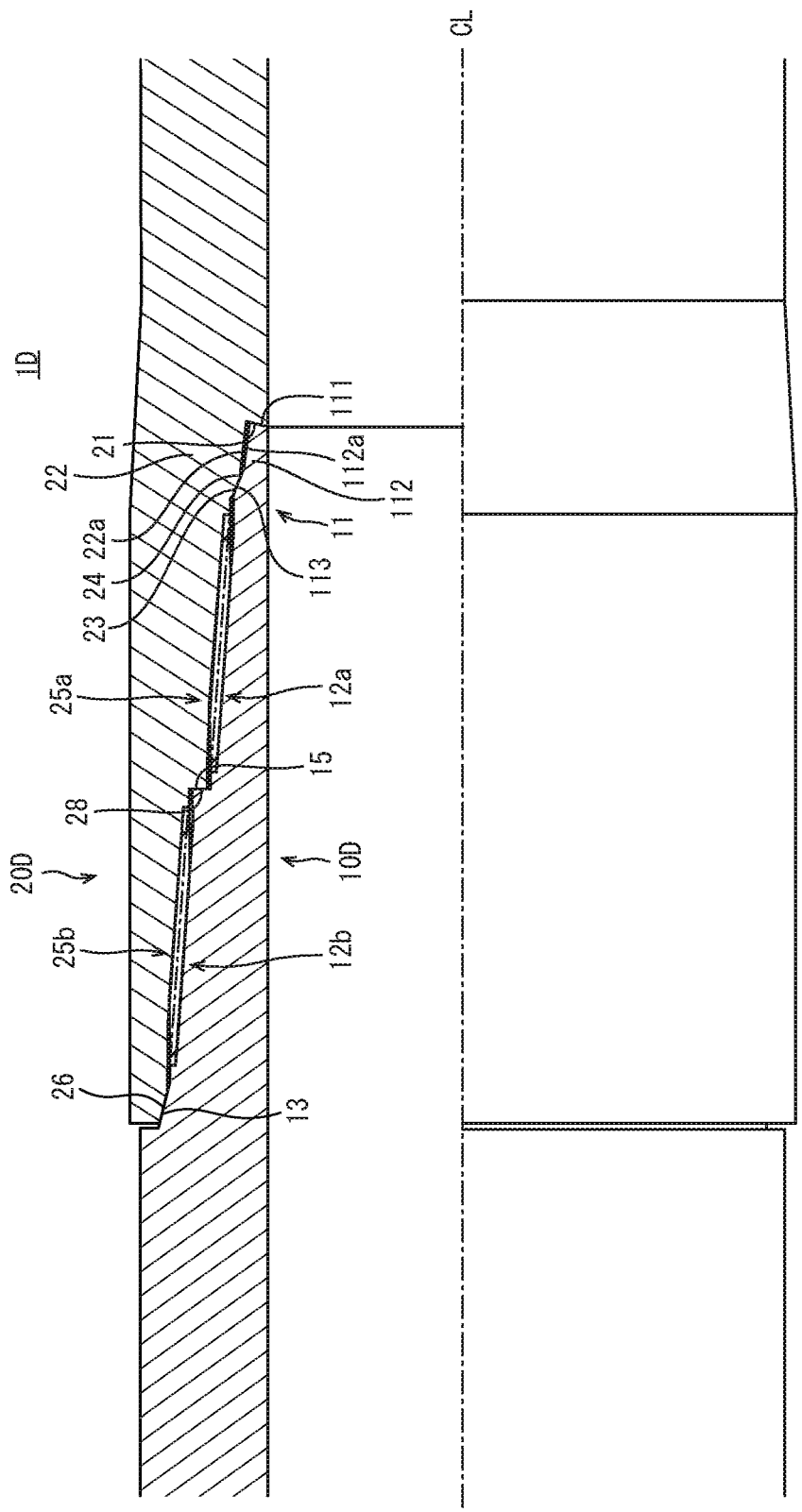
FIG. 10 is a schematic longitudinal cross-sectional view of a threaded connection for steel pipe according to a third embodiment.

FIG. 10 is a schematic longitudinal cross-sectional view of a threaded connection 1D for steel pipe according to a third embodiment. The threaded connection 1D shown in FIG. 10 is an integral-type threaded connection, but may be a coupling-type threaded connection.

The pin 10D of the threaded connection 1D includes an inner male thread 12a and an outer male thread 12b, each composed of a tapered thread. That is, the pin 10D includes a two-stage thread system.

The pin 10D further includes a pin shoulder surface 15. The pin shoulder surface 15 is in the middle of the pin 10D as determined along the pipe-axis direction. The pin shoulder surface 15 is located between the inner male thread 12a and outer male thread 12b. The pin shoulder surface 15 is a toroidal surface crossing the pipe-axis direction of the threaded connection 1D.

The box 20D of the threaded connection 1D includes an inner female thread 25a and an outer female thread 25b corresponding to the inner male thread 12a and outer male thread 12b. The inner and outer female threads 25a and 25b are constituted by tapered threads that engage the inner and outer male threads 12a and 12b, respectively.

The box 20D includes a box shoulder surface 28 corresponding to the pin shoulder surface 15. The box shoulder surface 28 is located between the inner and outer female threads 25a and 25b. The box shoulder surface 28 is a toroidal surface crossing the pipe-axis direction of the threaded connection 1D. The pin and box shoulder surfaces 15 and 28 are in contact with each other when the connection has been made up, forming a shoulder assembly.

Fourth Embodiment

Figure 11:
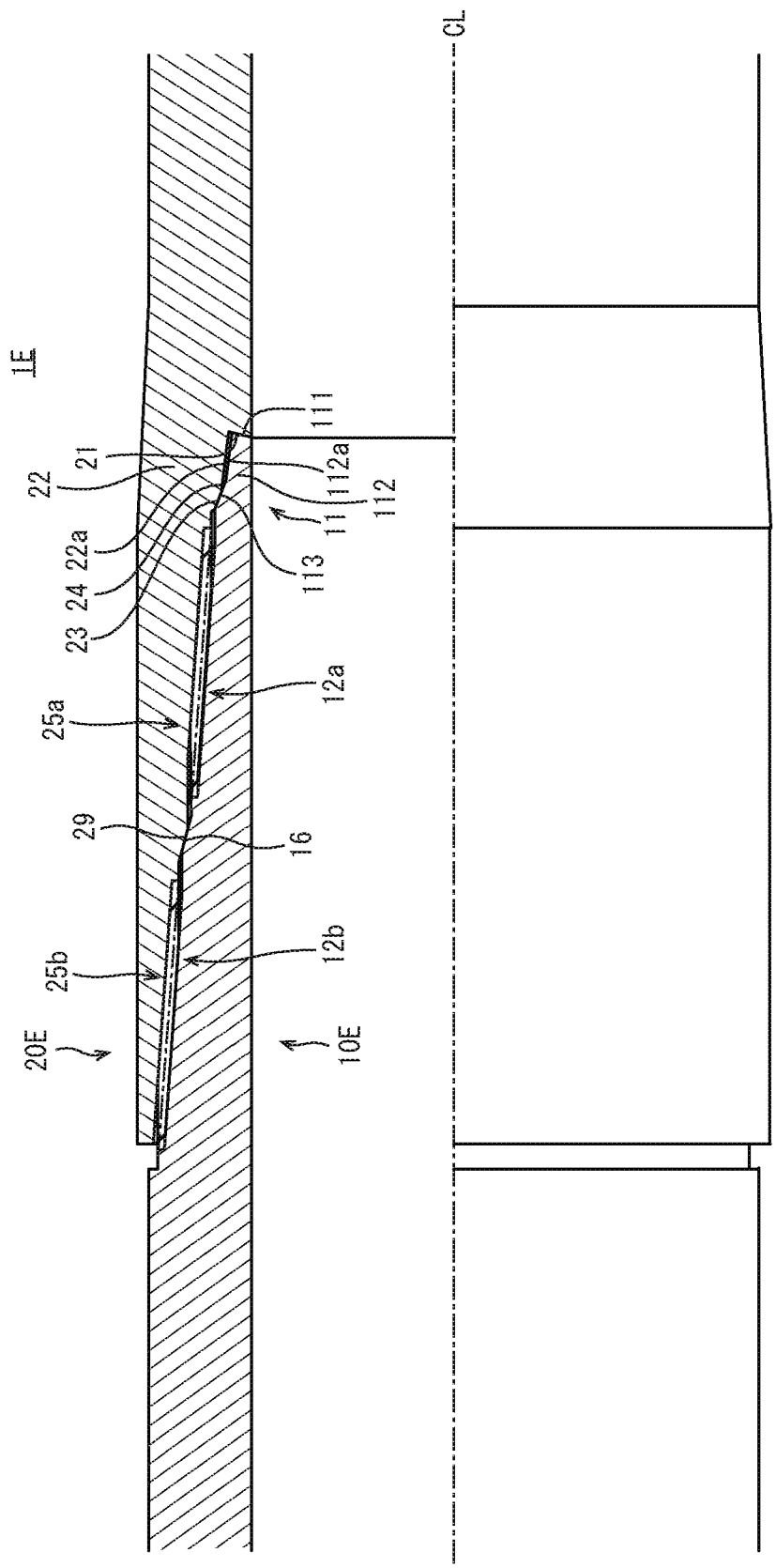
FIG. 11 is a schematic longitudinal cross-sectional view of a threaded connection for steel pipe according to a fourth embodiment.

FIG. 11 is a schematic longitudinal cross-sectional view of a threaded connection 1E for steel pipe according to a fourth embodiment. The threaded connection 1E shown in FIG. 11 is an integral-type threaded connection, but may be a coupling-type threaded connection.

The pin 10E of the threaded connection 1E includes a pin sealing surface 16 instead of the pin shoulder surface 15 of the third embodiment. The pin sealing surface 16 is provided on the outer periphery of the pin 10E and located in the middle of the pin 10E as determined along the pipe-axis direction. The pin sealing surface 16 is located between the inner and outer male threads 12a and 12b.

The box 20E of the threaded connection 1E includes a box sealing surface 29 corresponding to the pin sealing surface 16. The box sealing surface 29 is provided on the inner periphery of the box 20E and is located between the inner and outer female threads 25a and 25b. The pin and box sealing surfaces 16 and 29 are in contact with each other when the connection has been made up, forming a seal.

Although embodiments have been described, the present disclosure is not limited to the above-described embodiments, and various modifications are possible without departing from the spirit of the disclosure.

EXAMPLES

To verify the effects of the threaded connection for steel pipe according to the present disclosure, a numerical simulation analysis was conducted using the elastic-plastic finite element method. More specifically, an axisymmetric elastic-plastic finite element analysis was used to show by how much the risk of galling on the sealing surfaces may be reduced by causing the taper guide surfaces to slide against each other during make-up and to what extent a buffer surface may prevent damage on or deformation of the taper guide surfaces from adversely affecting the sealing surfaces.

[Analysis Conditions]

Models of the coupling-type threaded connection having the basic construction shown in FIGS. 1 and 3 was used to conduct an elastic-plastic finite element analysis, with different geometries and dimensions of the inner end as determined along the pipe-axis direction, shown in Table 1.

TABLE 1

| # | Dp1 [mm] | Dp2 [mm] | Lp1 [mm] | Lp2 [mm] | Db1 [mm] | Db2 [mm] | Lb1 [mm] | Lb2 [mm] | R [mm] | Buffer surface length [mm] | Remarks |
|---|---|---|---|---|---|---|---|---|---|---|---|
| 0 | 328.90 | 329.86 | 3.76 | 6.60 | 328.47 | 329.92 | 4.20 | 9.50 | complex R | 1.1 | comp. ex. |
| 1 | 329.78 | 330.95 | 4.50 | 8.78 | 328.47 | 329.92 | 4.20 | 9.50 | R0.3 | 0.03 | comp. ex. |
| 2 | 329.78 | 330.95 | 4.50 | 8.78 | 328.47 | 329.92 | 4.20 | 9.50 | R5 | 0.5 | comp. ex. |
| 3 | 329.78 | 330.95 | 4.50 | 8.78 | 328.47 | 329.92 | 4.20 | 9.50 | R10 | 1.00 | inv. ex. |
| 4 | 329.78 | 330.95 | 4.50 | 8.78 | 328.47 | 329.92 | 4.20 | 9.50 | complex R | 1.10 | inv. ex. |
| 5 | 329.78 | 330.95 | 4.50 | 8.78 | 328.47 | 329.92 | 4.20 | 9.50 | R20 | 2.00 | inv. ex. |

In the threaded connections labeled Nos. 1 to 5, the dimensions Dp1, Dp2, Lp1 and Lp2 for the pin and the dimensions Db1, Db2, Lb1 and Lb2 for the box were the same and the geometries and dimensions of the buffer surface were different. In Table 1, R indicates the radius of curvature of the buffer surface, while complex R indicates a complex geometry with the two Rs of a tangent circle smoothly connecting to the taper surface of the box sealing surface and a tangent circle smoothly connecting to the box taper guide surface.

The threaded connections labeled Nos. 1 to 5 each satisfy expressions (1) and (2). As such, in the threaded connections labeled Nos. 1 to 5, during make-up, the taper guide surfaces begin to slide against each other before the sealing surfaces begin to slide against each other. In the threaded connections labeled Nos. 3 to 5, the length of the buffer surface as measured in the pipe-axis direction was not smaller than 0.75 mm, while in the threaded connections labeled Nos. 1 and 2, the length of the buffer surface as measured in the pipe-axis direction was smaller than 0.75 mm. That is, the threaded connections labeled Nos. 3 to 5 are inventive examples that fall within the ranges of the present disclosure, while the threaded connections labeled Nos. 1 and 2 are comparative examples that fall outside the ranges of the present disclosure.

The threaded connection labeled No. 0 had a value of Db2 larger than Dp2 and thus did not satisfy expression (1). Thus, the threaded connection labeled No. 0 is a comparative example that falls outside the ranges of the present disclosure.

The conditions common to the threaded connections labeled Nos. 0 to 5 are as follows:
Dimensions of steel pipe: 346.08 mm in nominal outer diameter, and 15.88 mm in nominal wall thickness;
Material: L80 steel according to the API standards (with an elastic modulus of 210 kN/mm$^2$, a Poisson's ratio of 0.3, a yield stress of about 552 N/mm$^2$, and a work hardening modulus of 2000 N/mm$^2$); and
Seal tapering found when the connection is not made up: 50% (the slope angle θ of taper surface of the each sealing surface=about 14°).

[Analysis Method]
An analysis was conducted where a tightening process was simulated starting with a time point at which the taper guide surfaces began to be in contact and ending at a predetermined tightening-completion position (1.5/100 turns from the shouldering), and an analysis was conducted where a collapse pressure (external-pressure load) defined in the API standard 5C3 was applied to the threaded connection after tightening to the predetermined tightening-completion position. An external-pressure load was considered that migrated through the spiral-shaped gap on the threads to a position directly before the seal.

[Evaluation]
In the above-described analyses, the integral amount of the contact force between the sealing surfaces during the make-up process and the peak value of the seal contact pressure found when a collapse pressure (external-pressure load) according to the API standards was applied after make-up were evaluated. The integral amount of the contact force between the sealing surfaces during the make-up process has substantially the same meaning as the friction energy spent as the sealing surfaces contacted and slid against each other. The results of the analyses are shown in Table 2. In Table 2, the peak values of the seal contact pressure are represented by magnifications relative to the yield stress of the material (552 N/mm$^2$).

TABLE 2

| # | Integral amount of contact force of sealing surfaces during make-up [MN · mm] | Peak value of seal contact pressure during application of external-pressure load according to API standards | Remarks |
|---|---|---|---|
| 0 | 34.6 | 1.49 | comp. ex. |
| 1 | 23.1 | 2.88 | comp. ex. |
| 2 | 23.3 | 2.30 | comp. ex. |
| 3 | 23.5 | 1.98 | inv. ex. |
| 4 | 23.7 | 1.49 | inv. ex. |
| 5 | 24.0 | 1.65 | inv. ex. |

In the threaded connections labeled Nos. 1 to 5, which satisfied both expressions (1) and (2), the taper guide surfaces slid against each other during make-up; in the threaded connection labeled No. 0, which did not satisfy expression (1), the taper guide surfaces essentially did not contact each other during make-up. As such, the integral amount of the contact force between the sealing surfaces in each of the threaded connections labeled Nos. 1 to 5 was significantly smaller than the integral amount of the contact force between the sealing surfaces in the threaded connection labeled No. 0. This suggests that, if a threaded connection that satisfies expressions (1) and (2) is constructed, the risk of galling on the sealing surfaces will be very small.

When damage of on or deformation of the taper guide surface of the box affects the sealing surface, the contact pressure at the location where the damage or deformation has occurred becomes abnormally high, thus causing the sealing surface of the pin to be plastically deformed and become recessed such that a small displacement of the sealing surface can easily cause a leak. In the threaded connections labeled Nos. 1 and 2, in which the length of the buffer surface as measured in the pipe-axis direction was smaller than 0.75 mm, the peak value of the seal contact pressure was very large. In the threaded connections labeled Nos. 1 and 2, each sealing surface, when becoming recessed due to a peak contact pressure twice the yield stress of the material or higher, was deformed significantly. On the other hand, in the threaded connections labeled Nos. 3 to 5, in which the length of the buffer surface as measured in the pipe-axis direction was not smaller than 0.75 mm, the peak contact pressure was smaller than twice the yield stress of the material, which means that the risk of deformation of the sealing surfaces is small.

The above-described analysis results clearly demonstrate that the threaded connection according to the present disclosure reduces the risk of galling on the sealing surfaces and does not adversely affect sealing performance, especially that against the external pressure.

The invention claimed is:

1. A threaded connection for steel pipe, comprising:
a tubular pin provided at an end of a steel pipe body; and
a tubular box, the pin being inserted into the box such that the box and the pin are made up,
the pin including:
a pin lip forming a tip portion of the pin; and
a male thread provided on an outer periphery of the pin and located closer to the steel pipe body than the pin lip, the male thread being a tapered thread,
the pin lip including:
a first pin shoulder surface provided on a tip of the pin;
a nose located closer to the male thread than the first pin shoulder surface, the nose including a pin taper guide surface on its outer periphery, the pin taper guide surface having a diameter decreasing toward the tip of the pin; and
a first pin sealing surface provided on an outer periphery of the pin lip and located closer to the male thread than the nose, the first pin sealing surface including a taper surface having a diameter decreasing toward the tip of the pin,
the box including:
a first box shoulder surface located on an interior end of the box to correspond to the first pin shoulder surface, the first box shoulder surface being in contact with the first pin shoulder surface when the connection has been made up;
a nose-receiving portion provided to correspond to the nose, the nose-receiving portion including a box taper guide surface on its inner periphery, the box taper guide surface having a diameter decreasing toward the interior end of the box;
a first box sealing surface provided on an inner periphery of the box to correspond to the first pin sealing surface, the first box sealing surface including a taper surface having a diameter decreasing toward the interior end of the box, the first box sealing surface being in contact with the first pin sealing surface when the connection has been made up;
a buffer surface provided on the inner periphery of the box and located between the box taper guide surface and the taper surface of the first box sealing surface; and
a female thread provided on the inner periphery of the box to correspond to the male thread, the female thread being a tapered thread,
wherein each of the pin taper guide surface and the box taper guide surface has a first taper angle,
each of the taper surfaces of the first pin sealing surface and the first box sealing surface has a second taper angle, the second taper angle being larger than the first taper angle,
when the connection is not made up, the following expressions, (1) and (2), are satisfied:

$$Dp2 > Db2 > Dp1 \qquad (1),\text{ and}$$

$$Lb2 > Lp2 \qquad (2),$$

where Dp1 is the diameter of the end of the pin taper guide surface which is closer to the tip of the pin; Dp2 is the diameter of the intersecting line of a plane extending from the pin taper guide surface and a plane extending from the taper surface of the first pin sealing surface; Lp2 is the length as measured in a pipe-axis direction of the threaded connection which starts with the tip of the pin and ends with the intersecting line of the plane extending from the pin taper guide surface and the plane extending from the taper surface of the first pin sealing surface; Db2 is the diameter of the intersecting line of a plane extending from the box taper guide surface and a plane extending from the taper surface of the first box sealing surface; and Lb2 is the length as measured in the pipe-axis direction which starts with the interior end of the box and ends with the intersecting line of the plane extending from the box taper guide surface and the plane extending from the taper surface of the first box sealing surface, and the buffer surface has a length of 0.75 mm or larger as measured in the pipe-axis direction and is located outward of an imaginary plane as determined along a radial direction of the threaded connection, the imaginary plane being formed by the plane extending from the box taper guide surface and the plane extending from the first box sealing surface.

2. The threaded connection for steel pipe according to claim 1, wherein the first pin shoulder surface includes:
a pin main shoulder surface; and
a pin auxiliary shoulder surface disposed adjacent to an outer periphery of the pin main shoulder surface,
the first box shoulder surface includes:
a box main shoulder surface provided to correspond to the pin main shoulder surface, the box main shoulder surface being in contact with the pin main shoulder surface when the connection has been made up; and
a box auxiliary shoulder surface provided to correspond to the pin auxiliary shoulder surface, the box auxiliary shoulder surface being contactable with the pin auxiliary shoulder surface when the connection has been made up.

3. The threaded connection for steel pipe according to claim 1, wherein the pin further includes: a second pin sealing surface provided on the outer periphery of the pin and located, as determined along the pipe-axis direction, in a middle thereof or at an end thereof adjacent to the steel pipe body,
the box further includes: a second box sealing surface provided on the inner periphery of the box to correspond to the second pin sealing surface, the second box sealing surface being in contact with the second pin sealing surface when the connection has been made up.

4. The threaded connection for steel pipe according to claim 1, wherein the pin further includes: a second pin shoulder surface located, as determined along the pipe-axis direction, in a middle thereof or at an end thereof adjacent to the steel pipe body, the second pin shoulder surface crossing the pipe-axis direction,
the box further includes: a second box shoulder surface disposed to correspond to the second pin shoulder surface, the second box shoulder surface being in contact with the second pin shoulder surface when the connection has been made up.

5. The threaded connection for steel pipe according to claim 1, wherein at least one of the first pin sealing surface and the first box sealing surface further includes a curved surface provided to be contiguous to the taper surface, the curved surface having one or more curvatures.

6. The threaded connection for steel pipe according to claim 1, wherein the buffer surface includes a curved surface provided to be contiguous to the box taper guide surface and the first box sealing surface, the curved surface having one or more curvatures.

7. The threaded connection for steel pipe according to claim 1, wherein the buffer surface has a length of 2 mm or smaller as measured in the pipe-axis direction.

* * * * *